United States Patent
Dinc et al.

(10) Patent No.: US 6,840,519 B2
(45) Date of Patent: Jan. 11, 2005

(54) ACTUATING MECHANISM FOR A TURBINE AND METHOD OF RETROFITTING

(75) Inventors: Osman Saim Dinc, Troy, NY (US); Mehmet Demiroglu, Troy, NY (US); Hamid Reza Sarshar, Clifton Park, NY (US); Paul Gladen, Golden Valley, MN (US); Keith Hochhalter, Mound, MN (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,888

(22) Filed: Oct. 30, 2001

(65) Prior Publication Data

US 2003/0080510 A1 May 1, 2003

(51) Int. Cl.$^7$ .............................................. F16J 15/447
(52) U.S. Cl. ..................... 277/413; 277/303; 277/355; 277/421; 277/583
(58) Field of Search .................................. 217/355, 303, 217/391, 392, 415, 413, 421, 422, 431, 432, 583; 415/173.2, 173.3, 173.5, 174.1, 174.5, 175, 174.2

(56) References Cited

U.S. PATENT DOCUMENTS

| | | | | |
|---|---|---|---|---|
| 2,614,870 A | * | 10/1952 | Ray | ............................ 277/413 |
| 3,594,010 A | * | 7/1971 | Warth | .......................... 277/413 |
| 4,084,634 A | * | 4/1978 | Handa | ............................. 165/9 |
| 4,844,688 A | * | 7/1989 | Clough et al. | ............... 415/116 |
| 4,889,350 A | * | 12/1989 | Tranter | ........................ 277/388 |
| 5,014,917 A | * | 5/1991 | Sirocky et al. | ......... 239/265.11 |
| 5,076,590 A | * | 12/1991 | Steinetz et al. | .............. 277/355 |
| 5,342,065 A | * | 8/1994 | Blanke | ......................... 277/389 |
| 5,344,284 A | * | 9/1994 | Delvaux et al. | .......... 415/173.2 |
| 5,603,510 A | * | 2/1997 | Sanders | ........................ 277/413 |
| 5,971,400 A | * | 10/1999 | Turnquist et al. | ............ 277/416 |
| 6,050,081 A | | 4/2000 | Jansen et al. | |
| 6,250,641 B1 | * | 6/2001 | Dinc et al. | ................... 277/355 |
| 6,299,077 B1 | | 10/2001 | Harmon et al. | |
| 6,435,514 B1 | * | 8/2002 | Aksit et al. | ................. 277/355 |

* cited by examiner

*Primary Examiner*—Alison Pickard
(74) *Attorney, Agent, or Firm*—Richard DeCristofaro; Patrick K. Patnode

(57) ABSTRACT

One embodiment of the present invention comprises an actuating mechanism for a turbine comprising a compliant member (meaning at least one compliant member) comprising a series of serpentine folds forming a plurality of fold sections and a central cavity (meaning at least one central cavity) interposed between the adjacent fold sections wherein the compliant member is movable between a first retracted position and a second extended position upon introduction of a pressurized medium into the central cavity and dispersion of the pressurized medium within the serpentine folds.

26 Claims, 4 Drawing Sheets

ACTUATING MECHANISM FOR A TURBINE AND METHOD OF RETROFITTING

BACKGROUND OF THE INVENTION

The present invention relates generally to rotary machines, and more particularly to actuated seals for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth seal carrier segments and brush seals in a circumferential array between the rotor of the turbine and the circumferentially surrounding casing to minimize steam-path leakage. Springs hold the segments radially inward against surfaces on the casing that establish radial clearance between the seal and the rotor but allow segments to move radially outward in the event of rotor contact. While labyrinth seal carriers, singly or in combination with brush seals, have proved to be quite reliable, performance of labyrinth seal carriers degrades over time as a result of transient events in which the stationary and rotating components interfere, rubbing the labyrinth teeth into a "mushroom" profile and opening the seal clearance.

Accordingly, there is a need in the art for a rotary machine having improved leakage control between stationary and rotating components.

BRIEF DESCRIPTION OF THE INVENTION

One embodiment of the present invention comprises an actuating mechanism for a turbine comprising a compliant member (meaning at least one compliant member) comprising a series of serpentine folds forming a plurality of fold sections and a central cavity (meaning at least one central cavity) interposed between the adjacent fold sections wherein the compliant member is movable between a first retracted position and a second extended position upon introduction of a pressurized medium into the central cavity and dispersion of the pressurized medium within the serpentine folds.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
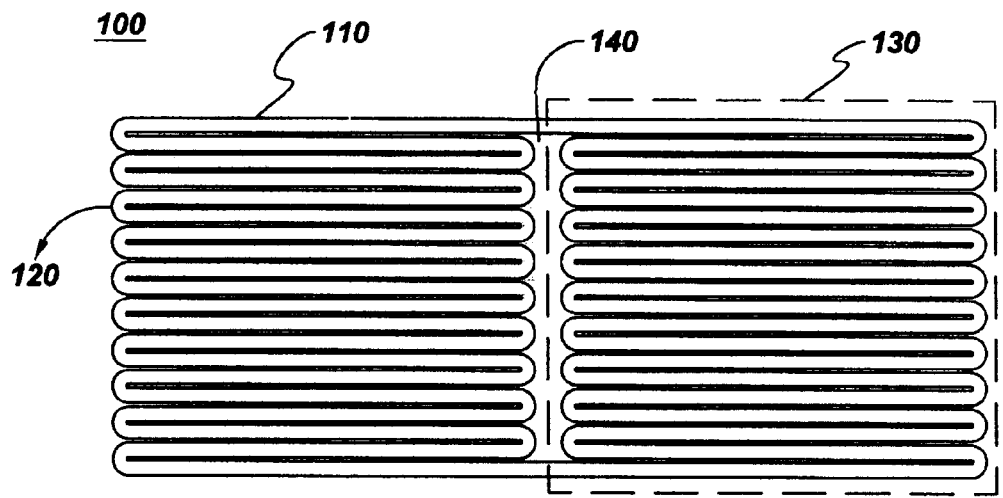
FIG. 1 is a schematic, cross sectional view of an actuating mechanism comprising serpentine folds in accordance with one embodiment of the present invention.
Figure 6:
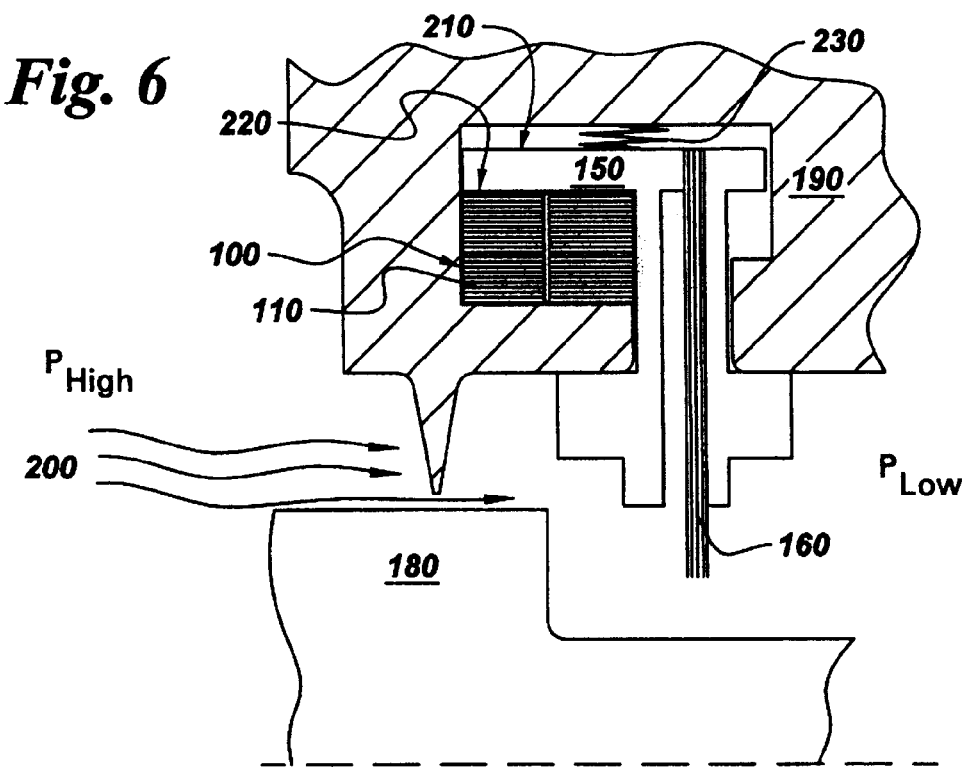
FIG. 6 is a schematic, cross-sectional exploded view of another embodiment of the present invention.

An actuating mechanism, generally designated 100, typically comprises at least one compliant member 110 having a series of serpentine folds 120 forming a plurality of fold sections 130 (see FIG. 1). At least one central cavity 140 is interposed between the adjacent fold sections 130 wherein the compliant member 110 is movable between a first retracted position and a second extended position upon introduction of a pressurized medium 145 (FIG. 2), such as, for example, gas or steam, into the central cavity 140 and dispersion of the pressurized medium 145 within the serpentine folds. FIG. 6, shows actuating mechanism 100 displaced in the second extended position (a radially outward position).

Figure 2:
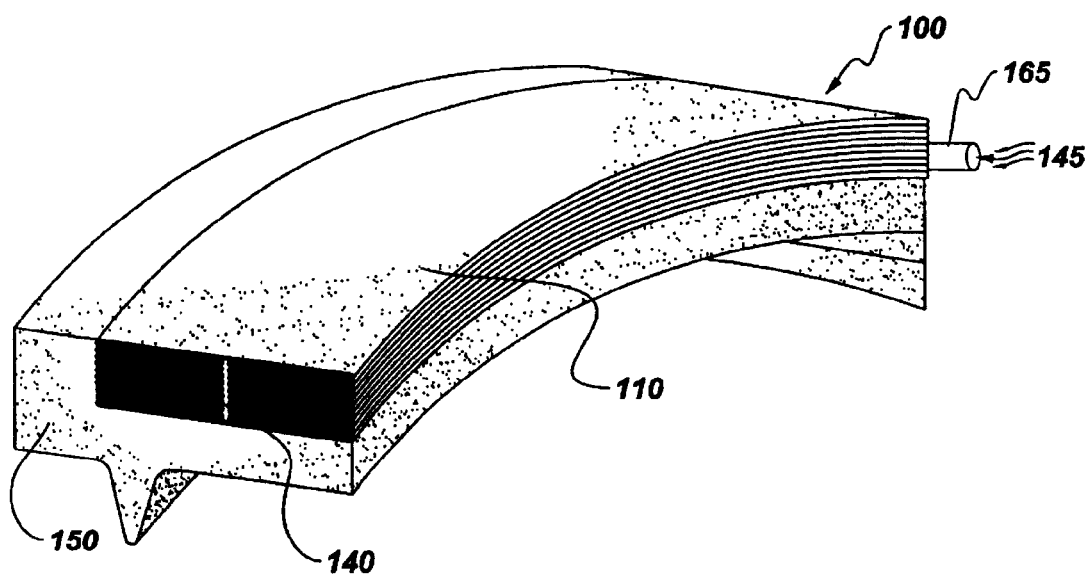
FIG. 2 is a schematic, cross-sectional view of an actuating mechanism secured to a seal carrier segment.
Figure 3:
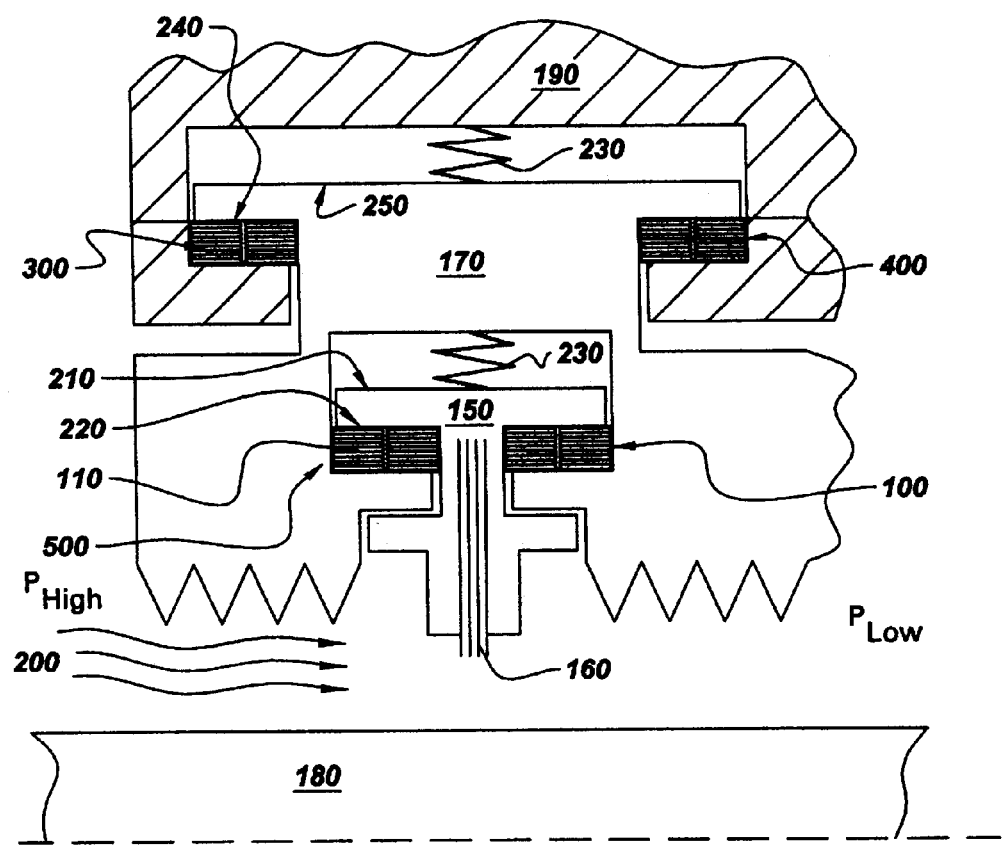
FIG. 3 is a schematic, cross-sectional view of an actuating mechanism secured to a labyrinth seal carrier segment.

FIG. 2 shows actuating mechanism 100 disposed on a seal carrier 150. As used herein, "on", "over", "above", "under" and the like are used to refer to the relative location of elements of actuating mechanism 100 as illustrated in the Figures and is not meant to be a limitation in any manner with respect to the orientation or operation of actuating mechanism 100. The seal carrier 150, singly or in combination, typically comprises at least one seal 160 (see FIG. 3), for example, at least one brush seal coupled to the seal carrier 150. It will be appreciated that other seals may also include, but are not limited to, abradable seals, honeycomb seals, leaf seals, finger seals, ceramic seals, aramid seals, aspirating seals and combinations thereof. One example of a labyrinth seal 170 comprising a seal carrier 150 disposed therein is shown in FIG. 3. Actuating mechanism 100 is typically disposed between a rotating member 180, for example a rotor, and a stationary turbine housing 190, which comprises the arcuate seal carrier 150 disposed adjacent to rotating member 180 separating pressure regions on axially opposite sides of arcuate seal carrier 150 (see FIG. 4). These components form part of a turbine in which a fluid medium 200, such as, for example, gas or steam, in a fluid path is passed between the rotating member 180 and turbine housing 190. For illustrative purposes, it will be appreciated, however, that fluid medium 200 in the fluid path flows from the high pressure side, designated "Phi", towards the low pressure side, designated "Plow", i.e., from the left to right of drawing FIG. 4.

In operation, actuating mechanism 100 actuates the seal carrier 150 to lower, lift off or to adjust seal carrier 150 position (see FIG. 4) during operation or during transient events, for example, during startup and shutdown. In one embodiment, at least one actuating mechanism 100 is positioned directly between seal carrier bottom surface 220 (see FIG. 4) and turbine housing 190, and, in an alternative or additional embodiment, at least one actuating mechanism 700 is positioned directly between seal carrier top surface 210 (see FIG. 5) and turbine housing 190. It will be appreciated by one of ordinary skill in the art that seal carrier 150 or labyrinth seal 170 is typically moved radially inward or radially outward depending on the position of actuating mechanism 100 with respect to the seal carrier 150 or labyrinth seal 170. As such, FIG. 3 shows the labyrinth seal 170 comprising an actuating mechanism 300 and an actuating mechanism 400 disposed between a labyrinth seal carrier bottom surface 240 and a labyrinth seal carrier top surface 250. A seal carrier is also disposed within labyrinth seal 170 comprising actuating mechanism 100 and actuating mechanism 500 disposed between seal carrier bottom surface 220 and labyrinth seal 170 wherein actuating mechanisms (100, 300, 400, 500), singly or in combination, actuate labyrinth seal 170 and seal carrier 150 radially. In addition, it will be appreciated that in another embodiment, actuating mechanism 100 and actuating mechanism 600 are disposed on seal carrier bottom surface and actuating mechanism 700 is disposed between seal carrier top surface 210 and turbine housing 190 so the actuating mechanisms, singly or in combination, lift, lower or adjust the seal carrier 150 during operation (see FIG. 5).

In operation, the pressurized medium 145 is introduced into the central cavity 140 of the compliant member 110 so as to be dispersed within the serpentine folds 120, move the seal carrier 150 radially and control the flow of the fluid medium 200 in the fluid path between the high and low pressure areas on axially opposite sides of the seal 160 (see FIG. 1). It will be appreciated that the source of the pressurized medium 145 may be located internal to the turbine or may be an external source to the turbine. An exemplary embodiment further comprises at least one pressurized medium inlet 165 (see FIG. 2) in communication with compliant member 110 so as to allow the pressurized medium 145 therethrough. The number and the position of pressurized medium inlets with respect to compliant member 110 may be varied depending on the application. In addition, the number and position used herein are only for illustrative purposes.

Figure 4:
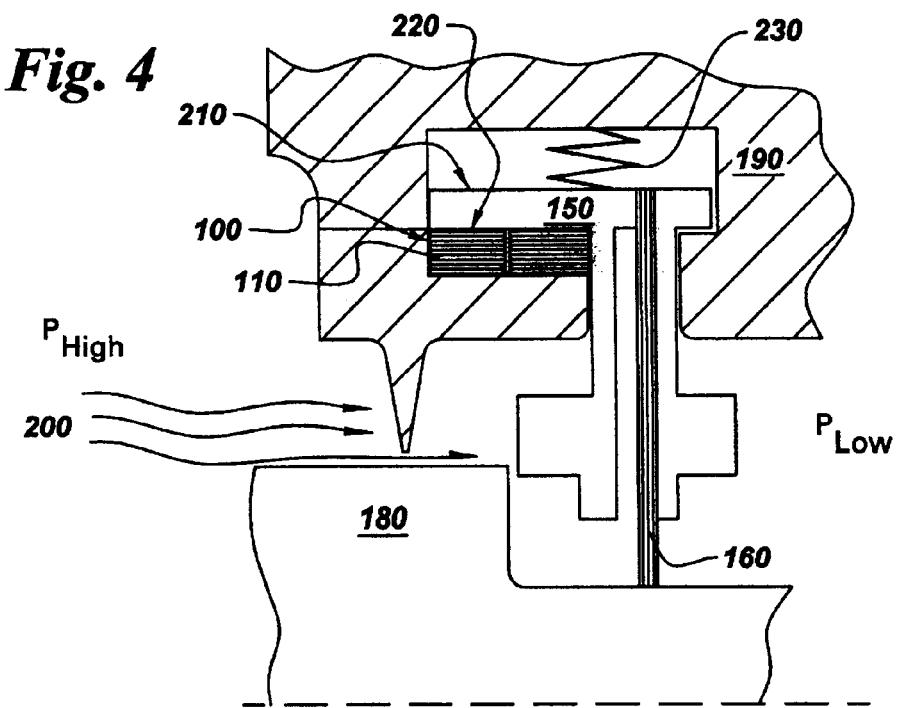
FIG. 4 is a schematic, cross-sectional exploded view of another embodiment of the present invention.
Figure 5:
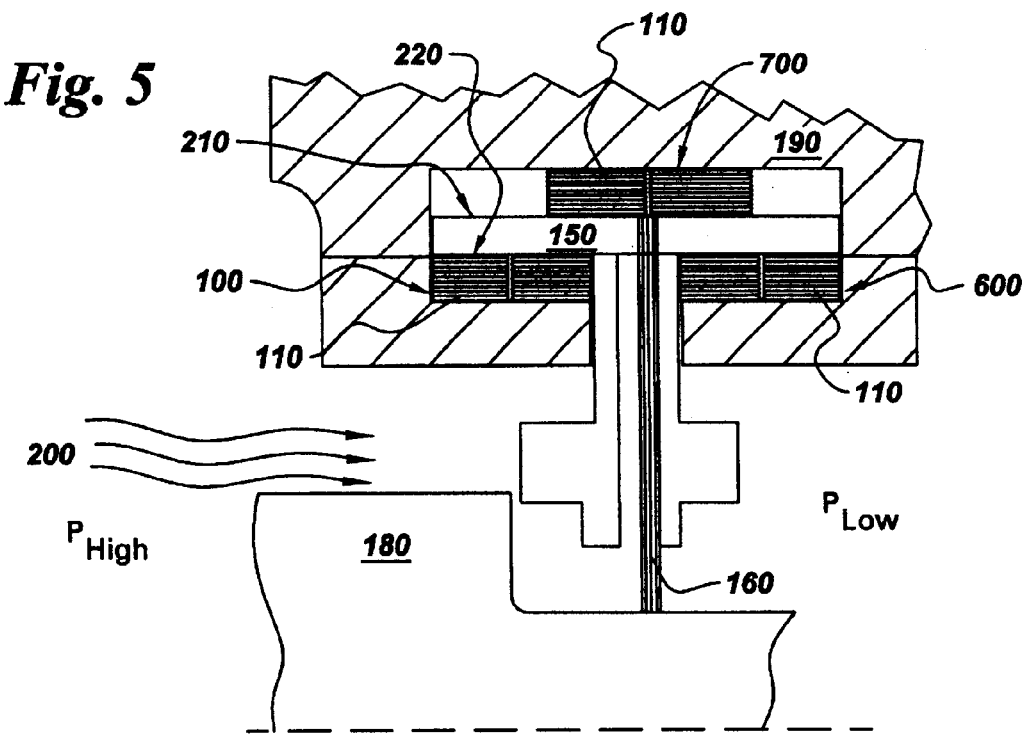
FIG. 5 is a schematic, cross-sectional exploded view of another embodiment of the present invention.
Figure 7:
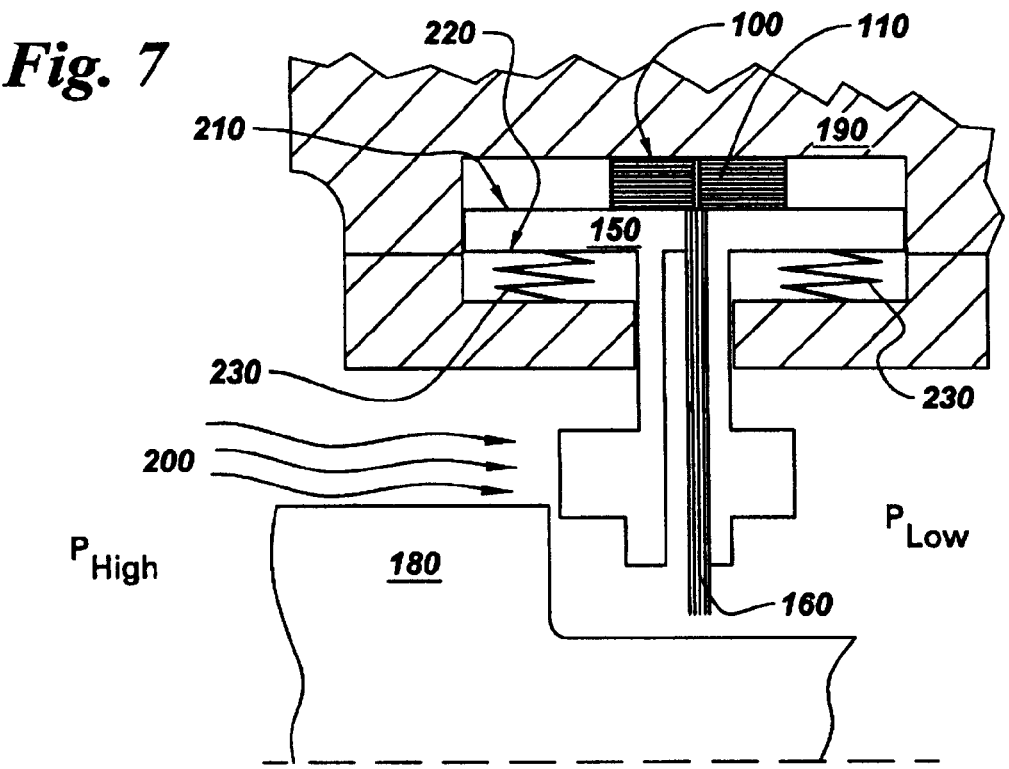
FIG. 7 is a schematic, cross-sectional exploded view of another embodiment of the present invention.

The aforementioned embodiments may comprise at least one spring 230 disposed between seal carrier bottom surface 220 and turbine housing 190, between seal carrier top surface 210 and turbine housing 190 or any combinations thereof. In FIG. 4, the spring 230 is located between seal carrier top surface 210 and turbine housing 190, such spring 230 providing an inward radial force keeping the seal 160 of seal carrier 150 disposed adjacent to rotating member 180. In an alternative embodiment, the spring 230 is located between seal carrier bottom surface 220 and turbine housing 190, such spring 230 providing an outward radial force keeping the seal 160 of seal carrier 150 from touching rotating member 180 (see FIG. 7). In operation, a method of retrofitting an actuating mechanism 100 in a turbine comprises providing the compliant member 110 that has a series of serpentine folds 120 forming a plurality of fold sections 130, providing a central cavity 140, which is interposed between adjacent fold sections 130, and positioning the compliant member 110 between the seal carrier 150 and the turbine housing 190. One advantage to such method of retrofitting the actuating mechanism 100 in a turbine is that actuating mechanism 100 is simply removed and replaced with another actuating mechanism 100 and down time of the turbine is thereby reduced. In some operations, such method of retrofitting allows a technician to replace actuating mechanism 100 without having to disassemble any major parts in the turbine thereby reducing repair costs. Another advantage of actuating mechanism 100 is that the life of the seal 160 (e.g., bristles) is extended by actuating the seal carrier 150 before the bristles or seal carrier 150 rub against rotating member 180. The life and performance of the brush seal bristles, singly or in combination with other seals, for example, is increased due to the fact that the bristles are not continuously rubbing at high speed which causes the bristles to reach a melting temperature or cause excessive wear. In addition, the performance of labyrinth seal 170 (see FIG. 3), singly or in combination with other seals, for example, does not degrade over time because the teeth on the labyrinth seal 170 are less prone to be rubbed into a "mushroom" profile thus maintaining an optimal seal clearance between labyrinth seal 170 and the rotating member 180.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An actuating mechanism disposed in a housing of a turbine, the housing having at least one seal carrier and at least one seal disposed therein, the actuating mechanism comprising:

a compliant member comprising a series of serpentine folds forming a plurality of fold sections;

a central cavity interposed between adjacent fold sections; and an inlet adapted to receive and introduce a pressurized medium into said central cavity during operation of the turbine, wherein said compliant member is movable between a first retracted position and a second extended position upon introduction of said pressurized medium into said central cavity and dispersion of said pressurized medium within said serpentine folds, and wherein said seal carrier is disposed in a labyrinth seal.

2. The actuating mechanism of claim 1, wherein said seal is selected from the group consisting of brush seals, abradable seals, honeycomb seals, leaf seals, finger seals, ceramic seals, aramid seals, aspirating seals and combinations thereof.

3. The actuating mechanism of claim 1, wherein dispersion of said pressurized medium within said serpentine folds moves said seal carrier and radially positions said seal to control a flow of a fluid medium in a fluid path between high and low pressure areas on axially opposite sides of said seal.

4. The actuating mechanism of claim 1, wherein said compliant member is disposed on a top surface of said seal carrier.

5. The actuating mechanism of claim 4, wherein a spring is disposed on a bottom surface of said seal carrier.

6. The actuating mechanism of claim 1, wherein said compliant member is disposed on a bottom surface of said seal carrier.

7. The actuating mechanism of claim 6, wherein said spring is disposed on a top surface of said seal carrier.

8. The actuating mechanism of claim 1, wherein a first respective one of said compliant members is disposed on a top surface of said seal carrier and a second respective one of said compliant members is disposed on a bottom surface of said seal carrier.

9. The actuating mechanism of claim 1, wherein said inlet is further adapted to receive and introduce said pressurized medium into said central cavity during a transient event of the turbine.

10. An actuating assembly for a turbine for controlling flow of a fluid medium in a fluid flow path comprising:
   a turbine housing;
   a rotating member disposed adjacent said turbine housing;
   a seal carrier comprising a seal, said seal carrier disposed within said turbine housing;
   a compliant member comprising a series of serpentine folds forming a plurality of fold sections disposed on said seal carrier;
   a central cavity interposed between adjacent fold sections; and
   an inlet adapted to receive and introduce a pressurized medium into said central cavity during operation of the turbine,
   wherein said compliant member is movable between a first retracted position and a second extended position upon introduction of said pressurized medium into said central cavity and dispersion of the said pressurized medium within said serpentine folds so as to move said seal carrier and radially position said seal to control said flow of said fluid medium between said seal and said rotating member, and
   wherein said seal carrier is disposed in a labyrinth seal.

11. The actuating assembly of claim 10, wherein said seal is selected from the group consisting of brush seals, abradable seals, honeycomb seals, leaf seals, finger seals, ceramic seals, aramid seals, aspirating seals and combinations thereof.

12. The actuating assembly of claim 10, wherein dispersion of said pressurized medium within said serpentine folds moves said seal carrier and radially positions said seal to control flow of said fluid medium in said fluid path between high and low pressure areas on axially opposite sides of said seal.

13. The actuating assembly of claim 10, wherein said compliant member is disposed on a top surface of said seal carrier.

14. The actuating assembly of claim 13, wherein a spring is disposed on a bottom surface of said seal carrier.

15. The actuating assembly of claim 10, wherein said compliant member is disposed on a bottom surface of said seal carrier.

16. The actuating assembly of claim 15, wherein a spring is disposed on a top surface of said seal carrier.

17. The actuating assembly of claim 10, wherein a first respective one of said compliant members is disposed on a top surface of said seal carrier and a second respective one of said compliant members is disposed on a bottom surface of said seal carrier.

18. The actuating assembly of claim 10, wherein said inlet is further adapted to receive and introduce said pressurized medium into said central cavity during a transient event of the turbine.

19. An actuating assembly for a turbine for controlling flow of a fluid medium in a fluid flow path comprising:
   a turbine housing;
   a rotating member disposed adjacent said turbine housing;
   a seal carrier comprising a seal, said seal carrier disposed within said turbine housing;
   a compliant member comprising a series of serpentine folds forming a plurality of fold sections disposed on said seal carrier; and
   a central cavity interposed between adjacent fold sections,
   wherein said compliant member is movable between a first retracted position and a second extended position upon introduction of a pressurized medium into said central cavity and dispersion of said pressurized medium within said serpentine folds so as to move said seal carrier and radially position said seal to control said flow of said fluid medium between said seal and said rotating member, and
   wherein said seal carrier is disposed in a labyrinth seal.

20. A method of retrofitting an actuating mechanism in a turbine comprising:
   providing a compliant member comprising a series of serpentine folds forming a plurality of fold sections;
   providing a central cavity interposed between adjacent fold sections;
   providing an inlet adapted to receive and introduce a pressurized medium into said central cavity during operation of the turbine; and
   positioning said compliant member between a seal carrier and a turbine housing, wherein said seal carrier is disposed in a labyrinth seal.

21. The method of claim 20 wherein positioning said compliant member further comprises positioning said compliant member between a seal carrier top surface and said turbine housing.

22. The method of claim 21 further comprising positioning at least one spring between a seal carrier bottom surface and said turbine housing.

23. The method of claim 20 wherein positioning said compliant member further comprises positioning said compliant member between said seal carrier bottom surface and said turbine housing.

24. The method of claim 23 wherein position said compliant member further comprises positioning said compliant member between said seal carrier bottom surface and said turbine housing and positioning at least one spring between a seal carrier top surface and said turbine housing.

25. The method of claim 20 wherein positioning said compliant member further comprises positioning a first respective one of said compliant members between a seal carrier bottom surface and said turbine housing and positioning a second respective one of said compliant members between a seal carrier top surface and said turbine housing.

26. The method of claim 20, wherein said inlet is further adapted to receive and introduce said pressurized medium into said central cavity during a transient event of the turbine.

* * * * *